US008572624B2

(12) United States Patent
Heller et al.

(10) Patent No.: US 8,572,624 B2
(45) Date of Patent: Oct. 29, 2013

(54) PROVIDING MULTIPLE QUIESCE STATE MACHINES IN A COMPUTING ENVIRONMENT

(75) Inventors: Lisa C. Heller, Rhinebeck, NY (US); Norbert Hagspiel, Wendlingen (DE); Ute Gaertner, Schoenaich (DE); Hanno Ulrich, Tuebingen (DE); Rebecca S. Wisniewski, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 1114 days.

(21) Appl. No.: 12/037,734

(22) Filed: Feb. 26, 2008

(65) Prior Publication Data
US 2009/0217269 A1 Aug. 27, 2009

(51) Int. Cl.
*G06F 9/46* (2006.01)
*G06F 7/38* (2006.01)

(52) U.S. Cl.
USPC .......................................... 718/105; 712/220

(58) Field of Classification Search
USPC ....................................................... 711/220
See application file for complete search history.

(56) References Cited

U.S. PATENT DOCUMENTS

| 4,647,925 | A | 3/1987 | Osman et al. |
| 5,038,307 | A | 8/1991 | Krishnakumar et al. |
| 6,996,698 | B2 * | 2/2006 | Slegel et al. ................... 711/220 |
| 7,020,761 | B2 | 3/2006 | Siegel et al. |
| 7,530,067 | B2 * | 5/2009 | Slegel et al. ................... 718/100 |
| 2003/0126162 | A1 | 7/2003 | Yohe et al. |
| 2004/0230976 | A1 | 11/2004 | Slegel et al. |
| 2008/0120486 | A1 * | 5/2008 | Ritz et al. ........................ 711/173 |

OTHER PUBLICATIONS

"IBM® z/Architecture Principles of Operation", Publication No. SA22-7832-05, 6th Edition, Apr. 2007 1,215 pages separated into 4 electronic attachments.

* cited by examiner

*Primary Examiner* — Jennifer To
*Assistant Examiner* — Wissam Rashid
(74) *Attorney, Agent, or Firm* — Cantor Colburn LLP; John Campbell

(57) ABSTRACT

A system, method and computer program product for providing multiple quiesce state machines. The system includes a first controller including logic for processing a first quiesce request. The system also includes a second controller including logic for processing a second quiesce request. All or a portion of the processing of the second quiesce request overlaps in time with the processing of the first quiesce request. Thus, multiple quiesce requests may be active in the system at the same time.

17 Claims, 17 Drawing Sheets

PROVIDING MULTIPLE QUIESCE STATE MACHINES IN A COMPUTING ENVIRONMENT

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

This invention relates generally to processing within a computing environment, and more particularly to reducing serialization of system requests.

The processing of a request by one processor of a computing environment may affect one or more other processors of the environment. For example, in a Symmetric Multiprocessing System (SMP) based on the IBM z/Architecture, there are certain broadcast purge operations such as Set Storage Key (SSKE), Invalidate Page Table Entry (IPTE), Invalidate DAT Table Entry (IDTE) and Compare and Swap and Purge (CSP and CSPG) which require all the processors in the system to quiesce in order to observe the system update(s) consistently. Other computer architectures also provide a similar mechanism.

One common implementation for the quiesce purge operation includes the following: 1) all the processors are quiesced (i.e., most normal processing operations are suspended, including accessing the TLB and ALB); 2) any buffered entries in the Translation Look-aside Buffers (TLBs) and/or in the Access-Register-Translation Look-aside Buffer (ALB) which are dependent on the resources being updated are invalidated; 3) the common resource (translation table entry in storage for IPTE, IDTE, CSP or CSPG or a storage key for SSKE) is updated, and 4) finally, the quiesce is released and the processors continue their normal activity. Obviously, this implementation could have a major performance impact, especially for large SMP configurations, since all processors must be quiesced for the duration of the operation. In particular, it is common that one processor is executing a long running instruction that is not interruptible, so that the one processor can not reach the quiesced state for some time. Thus, all other processors are required to wait for this last processor to reach the quiesced state before the steps described above can be completed.

Some strides have been made in the above processing to enhance performance by attempting to quiesce the processors for a shorter period of time. For example, in some implementations when a processor receives a request, it immediately quiesces and then purges the appropriate entries in its own TLB and/or ALB. After the purge is complete, this processor is allowed to continue processing subject to various restrictions. One of these restrictions includes that the processor is not permitted to perform address translation or fetch a storage key but instead must stall until the quiesce is released. Only after the quiesce is released, indicating that the system resources have been updated, are all restrictions removed from the processors.

Further strides to enhance performance are directed to reducing the restriction applied to address translation and key accesses during the quiesce window. For example, after purging its own TLB and/or ALB the purging processor is only restricted, using the page index (PX), segment index (SX) and/or absolute address of the translation, to perform an address translation or key access which potentially uses the system resources being updated by the quiesce operation. That restriction is referred to as the block-translation restriction.

Other performance enhancements have been directed to reducing the number of processors which need to honor the quiesce request. Since 1) the interruption of processors to honor the quiesce request is needed to prevent inconsistent values for translation tables or storage keys from being observed in the middle of an instruction or function and 2) when the active zone on the receiving processor is different from the zone which initiated the quiesce operation, the storage accesses being made by the receiving processor do not use the system resources that are being updated by the initiating zone, there is no need for processors running in a zone different than the quiesce-initiator's zone to be interrupted. This decreases the number of processors that need to be interrupted for a particular quiesce request and, in turn, also decreases the overall time needed to handle the quiesce request since the initiator needs to wait for fewer processors to respond to the interruption request.

Thus, although attempts have been made to reduce the amount of time processors are quiesced (e.g., for system resource updates), enhancements are still needed. For example, although fewer processors are required to honor the quiesce interruption and those processors that do honor the request are released early to do other work, only one quiesce request is allowed in the system at any given time.

BRIEF SUMMARY OF THE INVENTION

An exemplary embodiment of the present invention includes a system for facilitating processing of a computing environment. The system includes a first controller including logic for processing a first quiesce request. The system also includes a second controller including logic for processing a second quiesce request. All or a portion of the processing of the second quiesce request overlaps in time with the processing of the first quiesce request. Thus, multiple quiesce requests may be active in the system at the same time.

Another exemplary embodiment includes a method for facilitating processing of a computing environment. The method includes processing a first quiesce request at a first controller in the system. A second quiesce request is processed at a second controller in the system. All or a portion of the processing of the second quiesce request overlaps in time with the processing of the first quiesce request. Thus, multiple quiesce requests may be active at the same time.

A further exemplary embodiment includes a computer program product for facilitating processing of a computing environment. The computer program product includes a tangible storage medium readable by a processing circuit and storing instructions for execution by the processing circuit for performing a method. The method includes processing a first quiesce request at a first controller in the system. A second quiesce request is processed at a second controller in the system. All or a portion of the processing of the second quiesce request overlaps in time with the processing of the first quiesce request. Thus, multiple quiesce requests may be active at the same time.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

Referring now to the drawings wherein like elements are numbered alike in the several FIGURES.

DETAILED DESCRIPTION OF EXEMPLARY EMBODIMENTS

An exemplary embodiment provides a means to allow multiple quiesce requests to be active in the system at the same time. This is done in a way that requires no coordination in the system controller but instead relies on the proper dispatching of the work and coordination of the requests within the processor In accordance with an aspect of the present invention, a capability is provided to allow multiple broadcast quiesce operations to exist in the system at the same time provided that no coordination is needed between their updates to system resources. As one example, a quiesce state machine can be used based on the logical partition that requested the broadcast purge operation.

Figure 1:
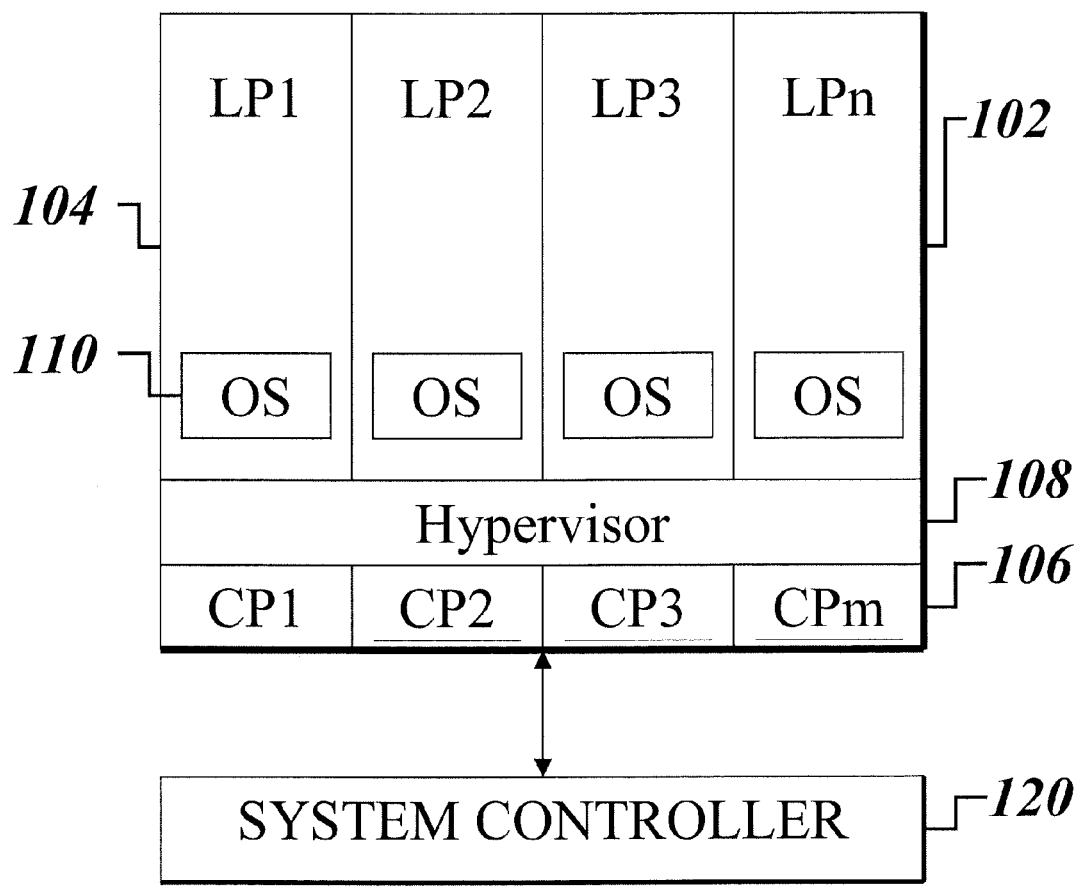
FIG. 1 depicts one embodiment of a computing environment that may be implemented by an exemplary embodiment of the present invention.

One embodiment of a computing environment 100 incorporating and using one or more aspects of the present invention is described with reference to FIG. 1. Computing environment 100 is based, for instance, on the z/Architecture offered by International Business Machines Corporation, Armonk, New York. The z/Architecture is described in an IBM® publication entitled, "z/Architecture Principles of Operation," IBM Publication No. SA22-7832-00, December 2000, which is hereby incorporated herein by reference in its entirety. In one example, a computing environment based on the z/Architecture includes an eServer zSeries, offered by International Business Machines Corporation, Armonk, N.Y.

As one example, computing environment 100 includes a central processor complex (CPC) 102 coupled to a system controller 120. Central processor complex 102 includes, for instance, one or more partitions 104 (e.g., logical partitions LP1-LPn), one or more central processors 106 (e.g., CP1-CPm), and a hypervisor 108 (e.g., a logical partition manager), each of which is described below.

Each logical partition 104 is capable of functioning as a separate system. That is, each logical partition 104 can be independently reset, initially loaded with an operating system 110, if desired, and operate with different programs. An operating system 110 or application program running in a logical partition 104 appears to have access to a full and complete system, but in reality, only a portion of it is available. A combination of hardware and Licensed Internal Code (commonly referred to as microcode or millicode) keeps a program in one logical partition from interfering with a program in a different logical partition. This allows several different logical partitions 104 to operate on a single or multiple physical processors in a time sliced manner. In this particular example, each logical partition 104 has a resident operating system 110, which may differ for one or more logical partitions 104. In one embodiment, operating system 110 is the z/OS operating system, offered by International Business Machines Corporation, Armonk, N.Y.

Central processors 106 are physical processor resources that are allocated to the logical partitions 104. For instance, a logical partition 104 includes one or more logical processors, each of which represents all or a share of physical processor resources 106 allocated to the partition. The logical processors of a particular partition 104 may be either dedicated to the partition, so that the underlying processor resource is reserved for that partition; or shared with another partition, so that the underlying processor resource is potentially available to another partition.

Logical partitions 104 are managed by hypervisor 108 implemented by microcode running on processors 106. Logical partitions 104 and hypervisor 108 each comprise one or more programs residing in respective portions of central storage associated with the central processors 106. One example of hypervisor 108 is the Processor Resource/Systems Manager (PR/SM), offered by International Business Machines Corporation, Armonk, N.Y.

System controller 120, which is coupled to the central processor complex, includes centralized logic responsible for arbitrating between different processors issuing requests. For instance, when system controller 120 receives a quiesce request, it determines that the requester is the initiating processor for that request and that the other processors are receiving processors; it broadcasts messages; and otherwise, handles requests. Further details are described with reference to FIG. 2.

Figure 2:
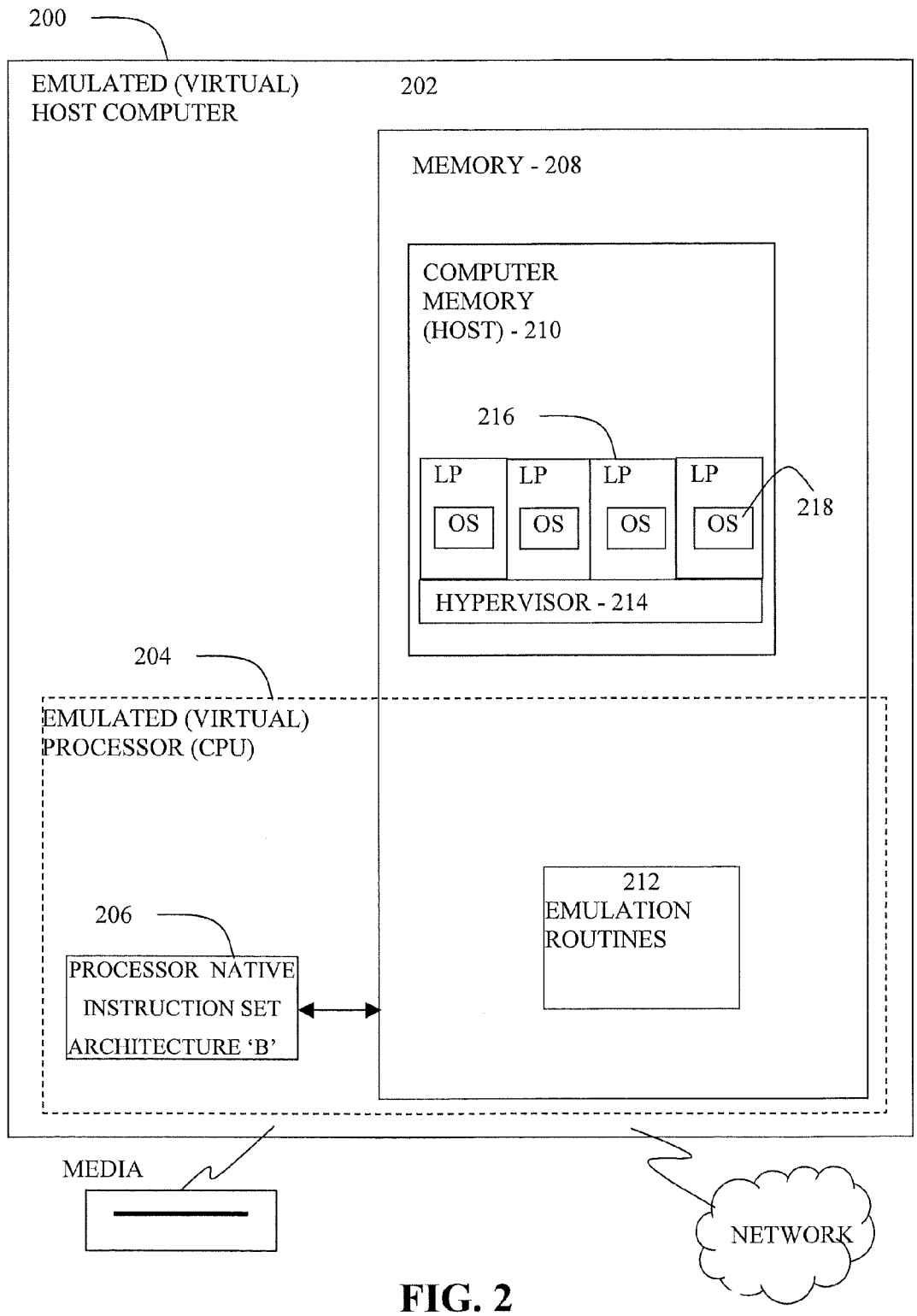
FIG. 2 depicts one embodiment of an emulated computing environment that may be implemented by an exemplary embodiment of the present invention.

Another example of a computing environment to incorporate one or more aspects of the present invention is depicted in FIG. 2. In this example, an emulated host computer system 200 is provided that emulates a host computer system 202 of a host architecture. In emulated host computer system 200, a host processor (CPU) 204 is an emulated host processor (or virtual host processor) and includes an emulation processor 206 having a different native instruction set architecture than used by the processors of host computer 202. Emulated host computer system 200 has memory 208 accessible to emulation processor 206. In the example embodiment, memory 208 is partitioned into a host computer memory 210 portion and an emulation routines 212 portion. Host computer memory 210 is available to programs of emulated host computer 200 according to host computer architecture, and may include both a host or hypervisor 214 and one or more hypervisors 214 running logical partitions (LPs) 216 running operating systems 218, analogous to the like-named elements in FIG. 1. Emulation processor 206 executes native instructions of an architected instruction set of an architecture other than that of the emulated processor 204, the native instructions obtained from emulation routines memory 212, and may access a host instruction for execution from a program in host computer memory 210 by employing one or more instruction(s) obtained in a sequence & access/decode routine which may decode the host instruction(s) accessed to determine a native instruction execution routine for emulating the function of the host instruction accessed. One such host instruction may be, for example, a Start Interpretive Execution (SIE) instruction, by which the host seeks to execute a program in a virtual machine. The emulation routines 212 may include support for this instruction, and for executing a sequence of guest instructions in accordance with the definition of this SIE instruction.

Other facilities that are defined for host computer system 202 architecture may be emulated by architected facilities routines, including such facilities as general purpose registers, control registers, dynamic address translation, and I/O subsystem support and processor cache for example. The emulation routines may also take advantage of functions available in emulation processor 204 (such as general registers and dynamic translation of virtual addresses) to improve performance of the emulation routines. Special hardware and offload engines may also be provided to assist processor 206 in emulating the function of host computer 202.

The interruption of processors to honor the quiesce request is needed to prevent inconsistent values for translation tables or storage keys from being observed in the middle of an instruction or function. Originally, the quiesce interruption was honored by all processors in the system. In actuality, when the active zone on the receiving processor is different from the zone that initiated the quiesce operation, the storage accesses being made by the receiving processor do not use the system resources that are being updated by the initiating zone. As a result, there is no need for processors running in a zone different than the quiesce-initiator's zone to be interrupted. We refer to this a "zone filtering" and it is accomplished by tagging each quiesce request with a zone number equal to the active zone of the initiator.

Since the TLB1 contains entries for the current zone only, it does not hold any entries relevant to an IPTE, IDTE, CSP or CSPG request from a different zone and, therefore, it does not need to process the invalidation and associated quiesce interruption at all. In the case of an SSKE initiated by a different zone, there may be host entries in the local TLB1 which contain the old key value. The invalidation of these entries, however, can be delayed, as long as it is done before executing any host instructions. Even when running in a different zone than the quiesce initiator, the TLB2 may have entries relevant to the quiesce request, although they are not currently being used. The TLB2 must invalidate the appropriate entries, although when the requesting zone is different from the initiator it may be done in the background, using the provided zone number and other relevant information. This decreases the number of processors that need to be interrupted for a particular quiesce request and, in turn, also decreases the overall time needed to handle the quiesce request since you need to wait for fewer processors to respond to the interruption request.

An algorithm that may used by the translator to determine if any particular quiesce request can filtered includes: if the incoming quiesce request is a host request, the receiving processor is currently running in host mode, or the active zone of the receiving processor matches the active zone of the quiesce initiator, then the translator must honor (i.e. can not filter) the quiesce interruption request. Otherwise, the processor may filter the request.

Figure 3:
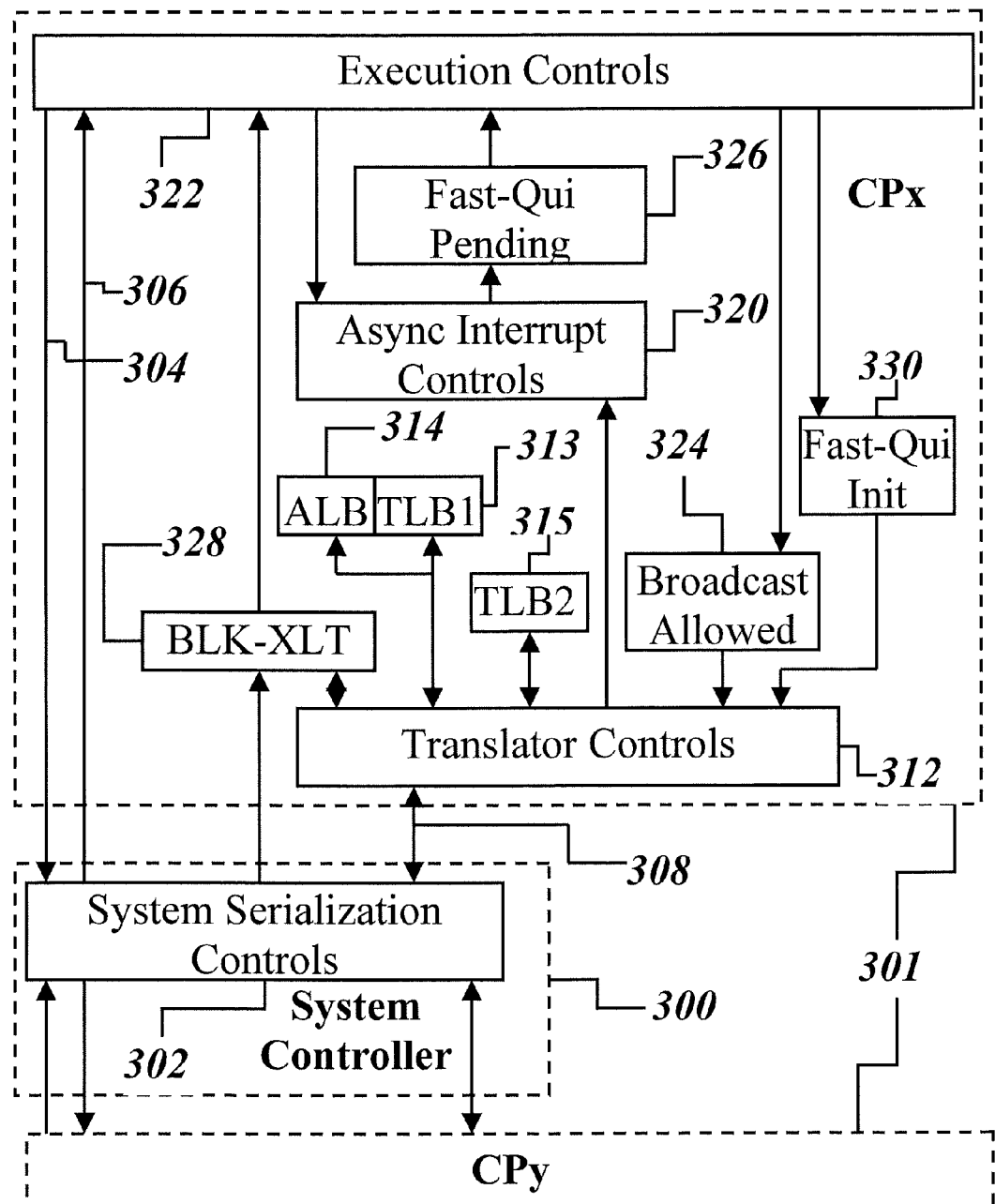
FIG. 3 depicts one embodiment of further details associated with a controller of FIG. 1, in accordance with an aspect of the present invention.

FIG. 3 depicts one example of a system controller 300 coupled to a plurality of central processors (CPUs) 301. In this example, two central processors are depicted. However, it will be understood that more than two processors may be coupled to system controller 300.

System Controller 300 includes various controls including, for instance, system serialization controls 302. The system serialization controls 302 are used to insure that operations that are to be serialized, such as Invalidate Page Table Entry (IPTE), Invalidate DAT Table Entry (IDTE), Set Storage Key Extended (SSKE), or Compare and Swap and Purge (CSP and CSPG) instructions, are serialized, such that only one such instruction is in progress at one time in the computing environment. It also monitors the sequence of events for that operation.

System controller 300 is coupled to each central processor 301 via various interfaces. For instance, an interface 304 to the controller 300 is used by the Licensed Internal Code in a central processor to send "control" commands, which specify an action to be taken, and to send "sense" commands, which return information from the controller 300. Another interface is a response bus 306, which is used to return information from the controller 300 for the "sense" commands. The response bus 306 is also used to communicate command status for "control" commands, and may be set from a plurality of sources within the controller 300, including the system serialization controls 302. A central processor 301 can use this interface to sense the state of the system serialization controls 302 in system controller 300.

A further interface is interface 308, which provides commands to translator controls 312 of central processor 301. Translator controls 312 process commands, in response to the signals. In one example, translator controls 312 process commands that affect one or more buffers, such as Translation Look-aside Buffers (TLBs) 313 and 315 and Access-Register-Translation Look-aside Buffers (ALBs) 314, described in further detail below.

In addition to translator controls 312, central processor 301 includes various other controls, including, for instance, asynchronous interruption controls 320 and execution controls 322. When the translator controls 312 receive a quiesce purge request from the controller 302, it determines if the request requires an interruption to this processor 301 and if it does, it sends a signal to the asynchronous interruption controls 320. In response to this, asynchronous interrupt controls 320 cause an internal fast-quiesce interruption 326 to be pending in the receiving processor, which in turn, causes execution controls 322 to suspend program instruction processing, at the next interruptible point. In response to the interruption, execution controls 322 invokes a millicode routine to set a broadcast operation allowed latch 324 to enable translator controls 312 to process the pending request. This causes the block-translation (BLK-XLT) latch 328 to be set on all processors 301 besides the fast-quiesce initiator, indicated by latch 330, until the system controller 300 receives the reset fast-quiesce command from the quiesce initiator. The block-translation latch 328 indicates to the translator controls 312 that certain translations (which may be associated with the pending system update) should be held until this latch 328 has dropped.

The above described computing environment is only one example. Many variations are possible without departing from the spirit of the present invention. For example, one or more partitions can be running in different architecture modes. Further, as another example, the environment need not be based on the z/Architecture, but instead, can be based on other architectures offered by Intel, Sun Microsystems, as well as others.

In one embodiment, to initiate a quiesce operation, the quiesce millicode issues a quiesce request to the system controller (SC) 300. In order to manage multiple quiesce operations, the SC serializes the quiesce commands and guarantees that only one is active in the system at any given time. In the system serialization controls 302, the SC maintains a Quiesce State Machine (QSM) that tracks the progress of the quiesce request in the system. In one implementation, the QSM tracks if the quiesce engine is idle ('00'B), is waiting for the receiving processors to handle the quiesce request ('01'B) or is waiting for the initiating processor to reset the quiesce request indicating it has updated the system resources and all TLBs have completed the request ('10'B). This is described in more detail in FIG. 4.

Figure 4A:
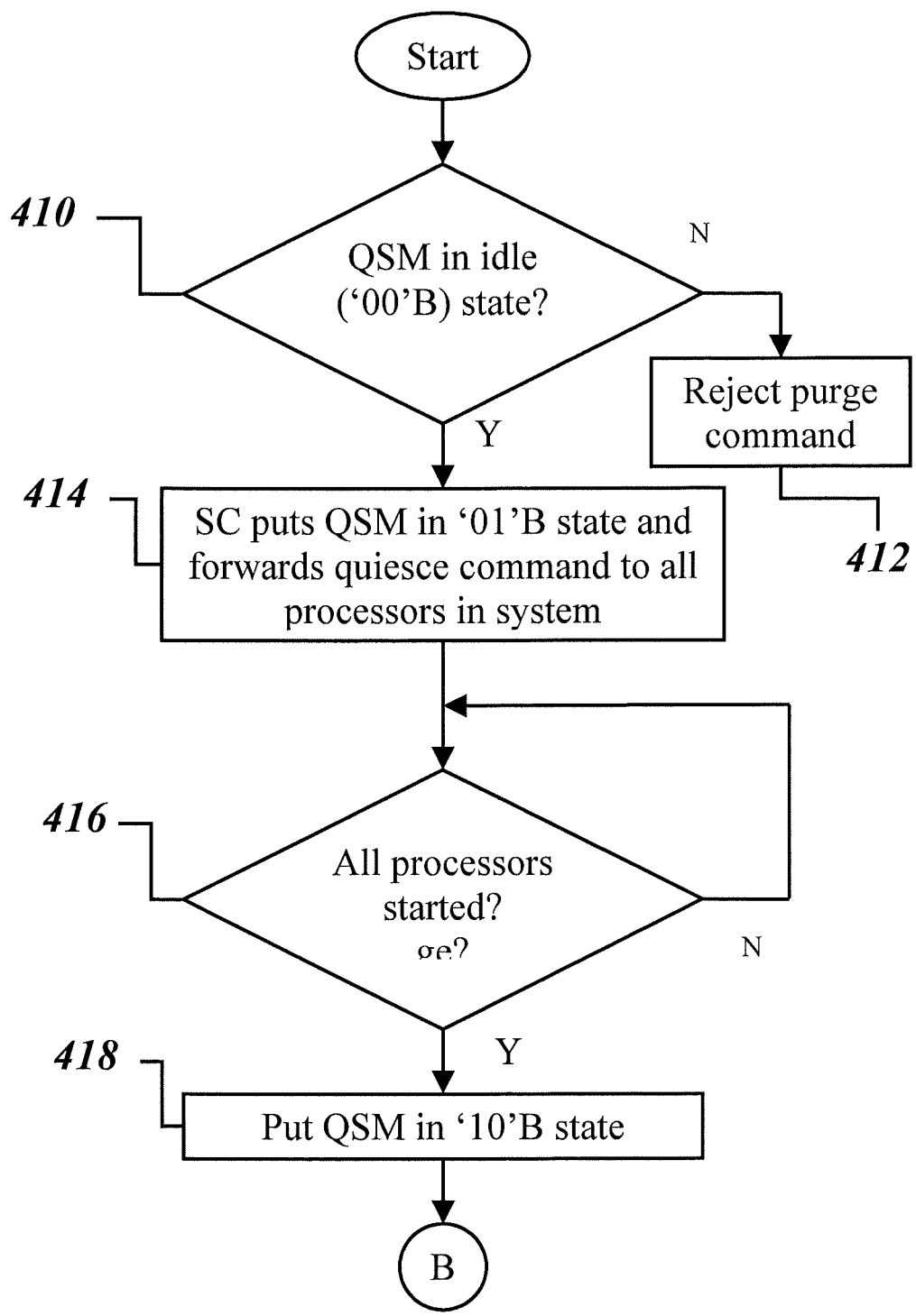
FIGS. 4A-4B depict logic for managing a quiesce state machine, in accordance with an aspect of the present invention.
Figure 4B:
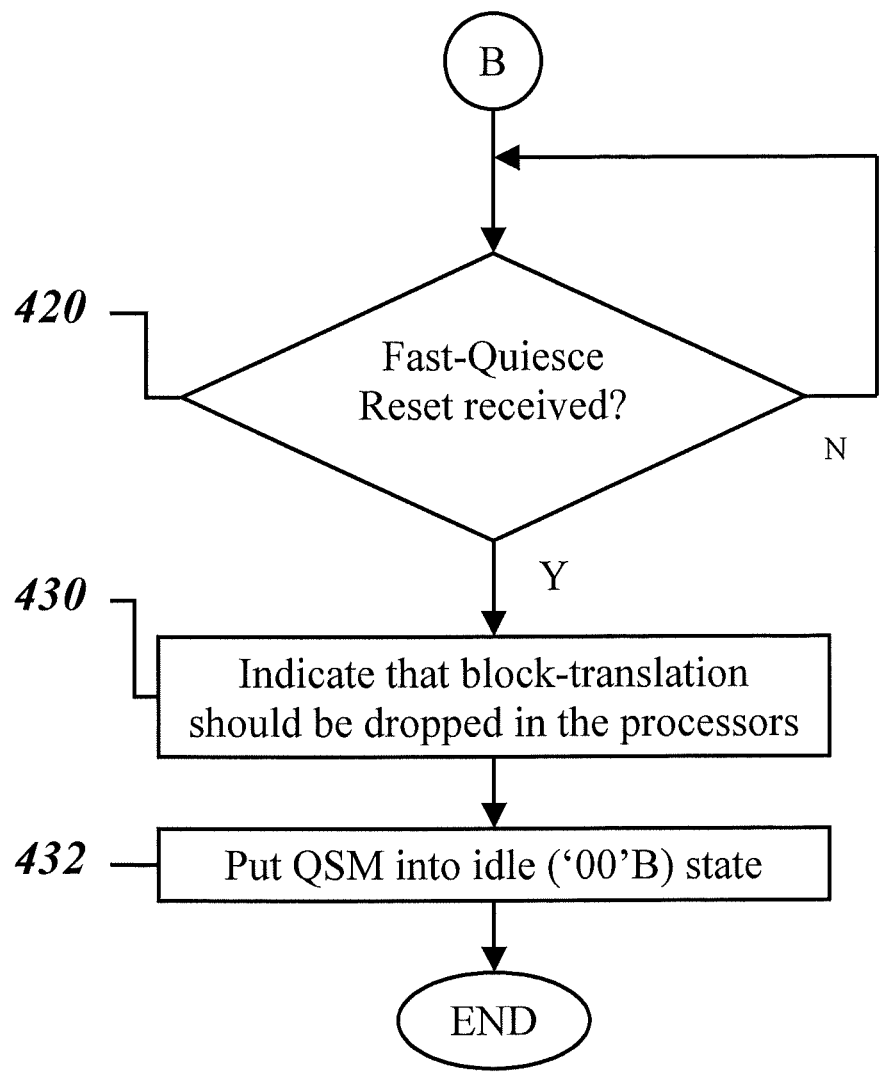

Beginning in FIG. 4A, when the SC receives a quiesce request and the Quiesce State Machine (QSM) is not in the '00'B (idle) state (410), the SC will reject the request (412). If the quiesce engine is idle (410), it will accept the quiesce request, set the QSM to the '01' B state, and forward the request to all the processors 301 (as depicted in FIG. 3) in the system (414). Once receiving an indication from each translator that the associated processor has started the quiesce purge request (416), the QSM will enter the '10'B state (418). Continuing in FIG. 4B, when the SC receives a reset fast-quiesce command from the processor that initiated the quiesce request (420), it will indicate that the block-translation latch should be dropped (430) and reset the QSM to the idle state (432). The quiesce engine is now ready to handle the next quiesce request.

Figure 5A:
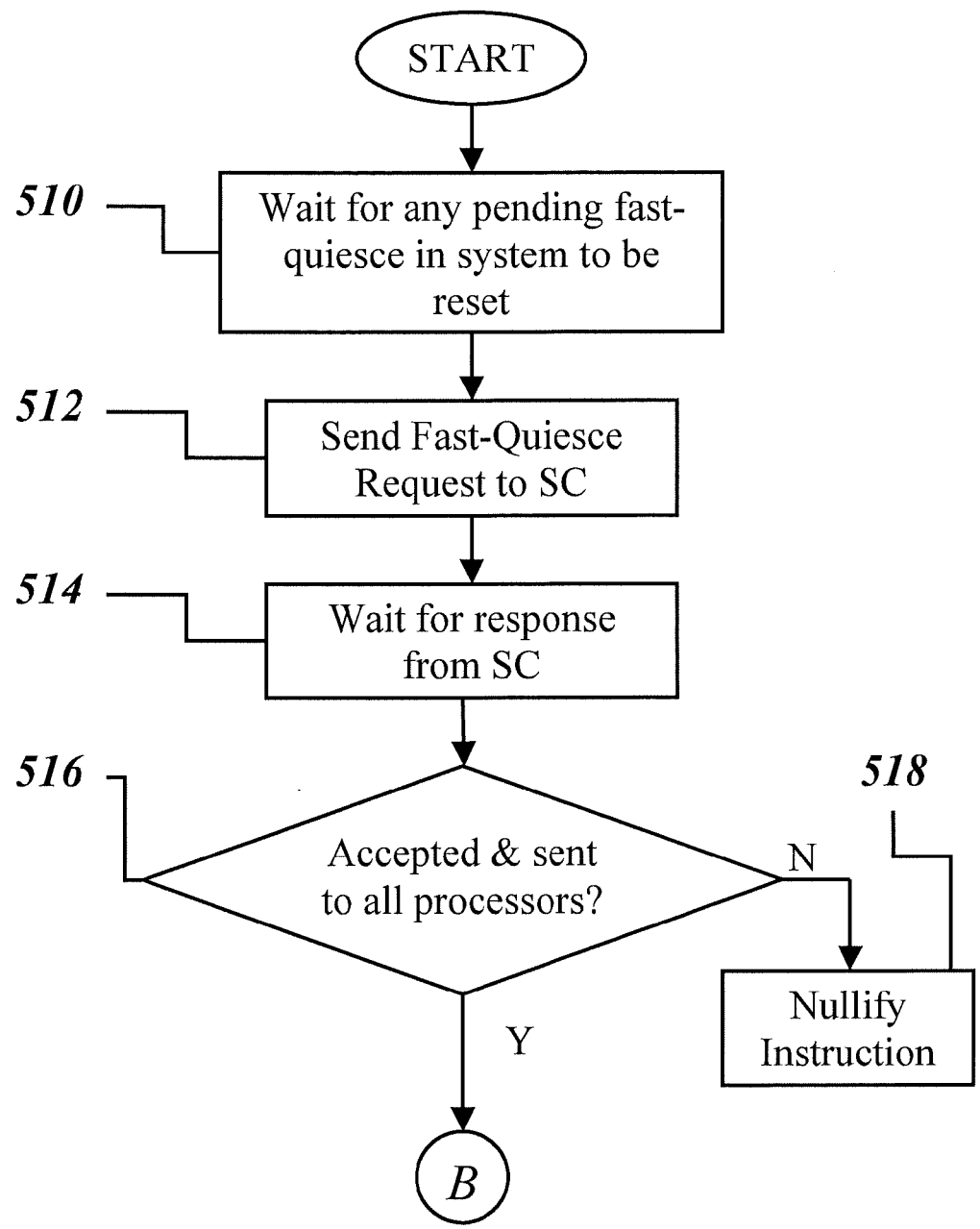
FIGS. 5A-5B depict one embodiment of the flow associated with controlling a system resource update across a computing environment, in accordance with an aspect of the present invention.
Figure 5B:
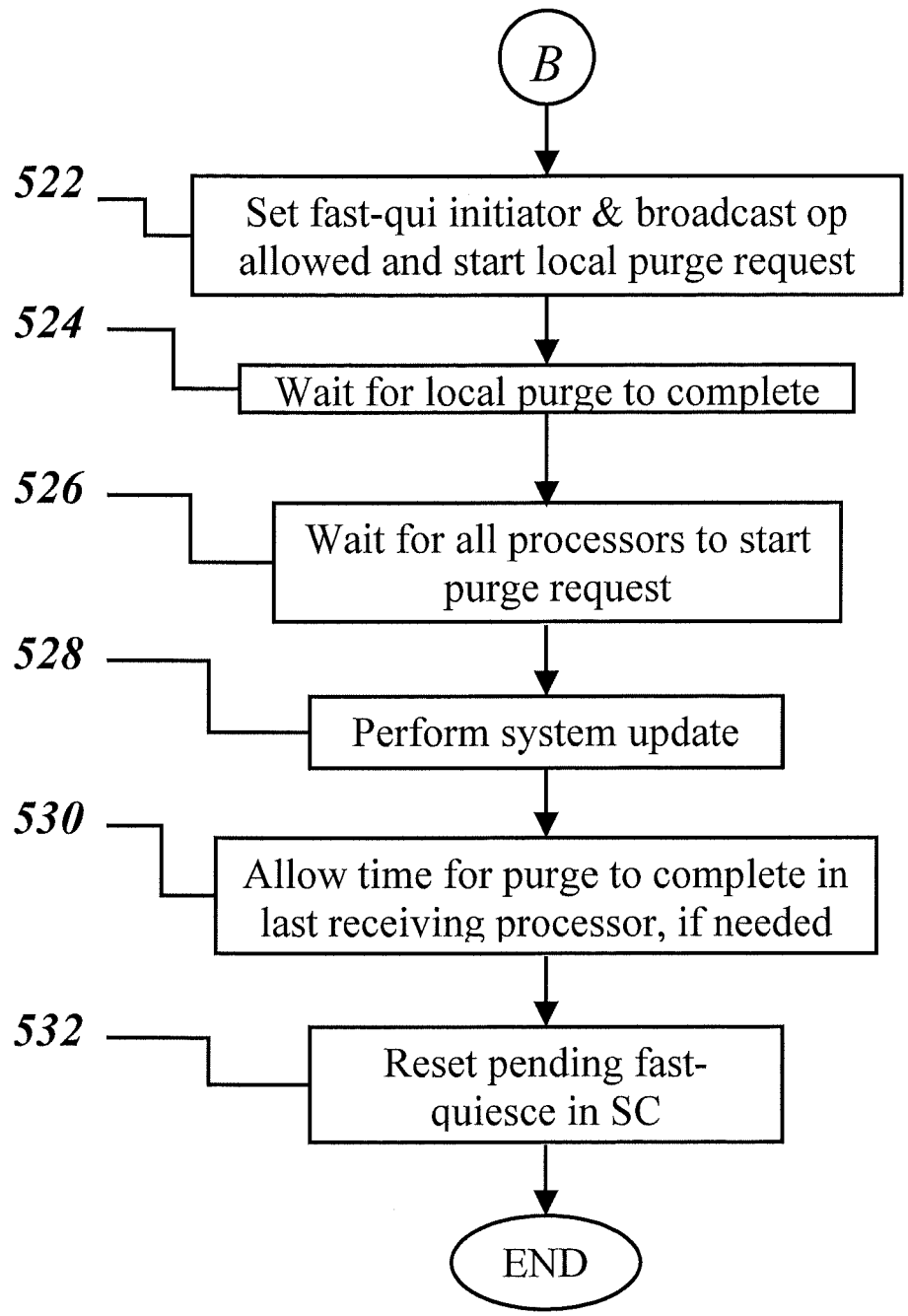

In one embodiment, the millicode on the fast-quiesce initiator (e.g., the processor that initiated the quiesce request) performs a series of tasks which include those steps described in FIGS. 5A and 5B. In particular, in FIG. 5A it begins its operation by waiting for any pending fast-quiesce to be reset in the system (510). Once any pending request has completed, as indicated by the SC, it sends its own fast-quiesce request to the SC (512). The SC receives the request and if no other fast-quiesce request has already been accepted, it will forward the request to all the processors in the system and send a response back to the initiating processor indicating that the request was accepted. If, however, there is already another fast-quiesce request being processed, the SC will send a response indicating that the request has been rejected. The millicode waits for the response from the SC (514) and then determines if the request was accepted or rejected (516).

If the response was rejected (518) the instruction is nullified and will be reissued. If the response was accepted (516), as depicted in FIG. 5B the millicode will set the fast-quiesce-initiator latch 330 (as depicted in FIG. 3), which indicates that block-translation does not apply to this processor, and the broadcast-op-allowed latch 324 (as depicted in FIG. 3), which causes the invalidation to be started in the TLB1s (522). The millicode in the initiating processor then waits for its own invalidation to complete (524) and then for the SC to indicate that all processors have started the purge (526). Once this has occurred, the initiating processor performs the system update (528). In the case of SSKE, this is a key update and in the case of IPTE, IDTE, CSP and CSPG it is a storage update.

The initiating processor then, for operations that require significant time to process in the TLB1s, must allow enough time to pass to guarantee that all TLBs in the system have completed the invalidation (530). Once this has occurred, it sends a command to the SC to reset the fast-quiesce request in the system (532).

In accordance with an aspect of the present invention, the ability to handle multiple quiesce requests in the system at the same time is provided. Previously, since the quiesce instructions are updating system resources, the SC allows only one quiesce request in the system at a time. This eliminates the need to coordinate between multiple updates. In one embodiment, each node has two SCs, SC0 and SC1, which operate completely independently of each other. Logically each SC has its own quiesce state machine (QSM): QSM0 on SC0, and QSM1 on SC1. From an SC perspective, QSM0 operates independently from QSM1 and each still honors only one fast-quiesce request at a time (for a total of two in the central processor complex at a time). The coordination of the two requests is handled separately at the local processor level by millicode and hardware. Of course, in another embodiment, there can be as many QSMs as there are zones.

Millicode is responsible for dispatching each quiesce request to the correct QSM and it does this by separating the quiesce requests based on the zone number of the initiating zone. This eliminates the need for the SC to coordinate the multiple system resource updates done by the quiesce operations. In addition, since the quiesce interruptions are filtered based on zone number, it minimizes the number of processors that will need to be interrupted for requests from multiple QSMs.

Since there is no coordination of the quiesce requests between the SCs and each SC forwards the commands to all the processors independently, the processor hardware and millicode have to allow for the fact that the requests may be seen in a different order on different processors. Because of this and the fact that the translator can receive multiple quiesce requests at the same time, the processor hardware and millicode must differentiate the requests from multiple QSMs.

Figure 6:
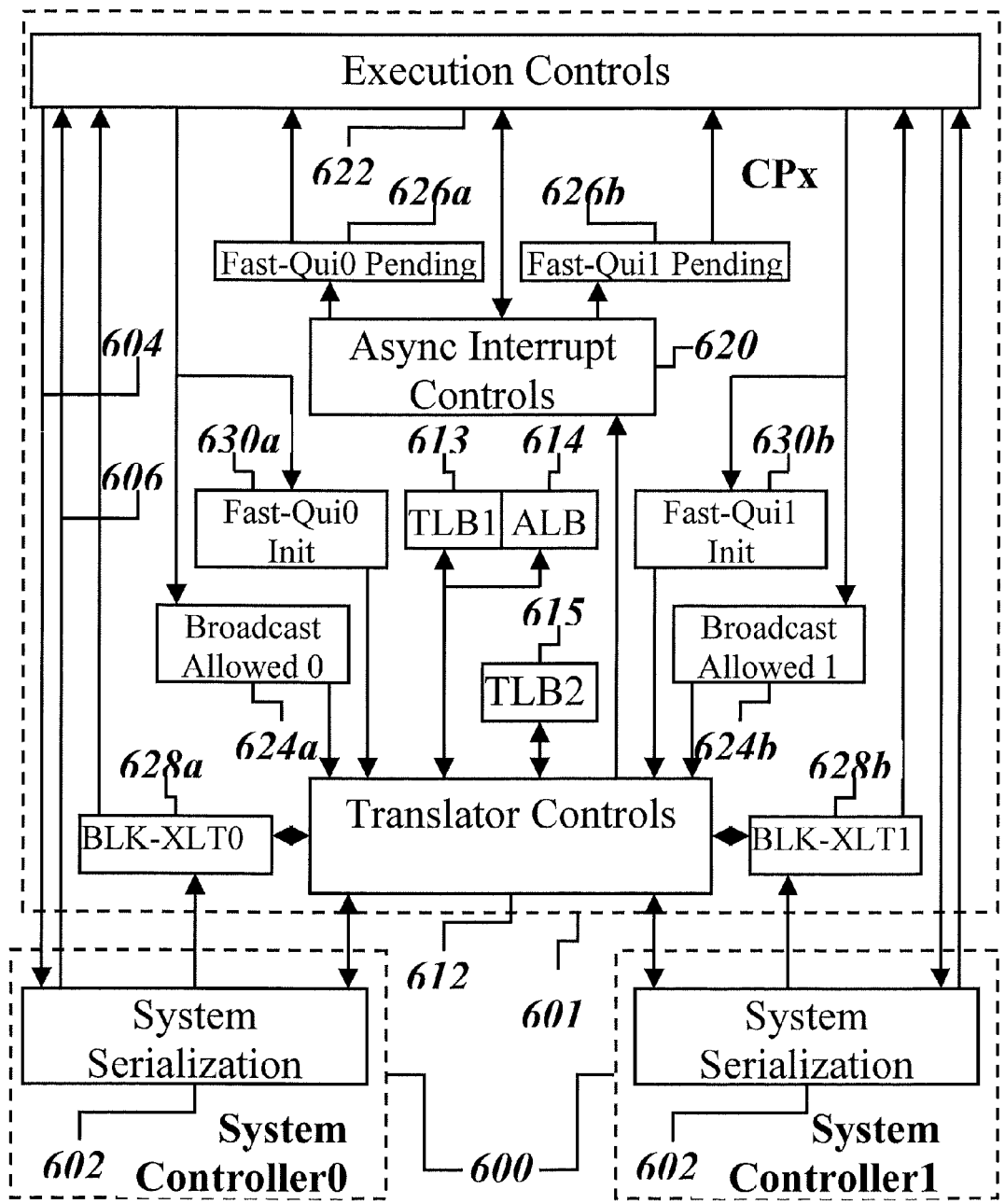
FIG. 6 depicts one embodiment of further details associated with a controller to coordinate quiesce purge requests from multiple controllers, in accordance with an aspect of the present invention.

FIG. 6 depicts one example of a central processor (CP) 601 being connected to a plurality of system controllers 600. In this example, one central processor (CPx) and two system controllers (SC0 and SC1) are depicted. However, it will be understood that there may be multiple central processors, that more than two system controller may be coupled to each central processor and that multiple central processors may be connected to each SC.

The communication controls between each system controller 600 and the central processor 601 are the same as depicted in FIG. 3 with interfaces 604, 606 and 608 in FIG. 6 corresponding to interfaces 304, 306 and 308 in FIG. 3. Logically, both the translator and the execution controls maintain two separate but similar interfaces, one to SC0 and one to SC1. In another embodiment, an intermediate controller is used to combine the interfaces from the various SCs into a single interface to the processor with a bit or bits indicating the originating and targeted SC for each data transfer.

In order to allow hardware and millicode to coordinate between the multiple quiesce requests, an additional tag is needed, to associate a particular request with a particular SC. When the translator controls 612 receive a quiesce purge request and, as appropriate, sends a signal to the asynchronous interruption controls 620, this signal is tagged with an indication of whether the request was from SC0 or SC1. The internal fast-quiesce interruption which is then made pending in the CP differentiates if that request was from SC0 626a or SC1 626b. When the millicode routine handles the request, it sets the corresponding broadcast operation allowed latch 624a or 624b, respectively, which enables translator controls 612 to process that command and, in turn, set the corresponding block-translation (BLK-XLT) latch 628a or 628b.

Figure 7A:
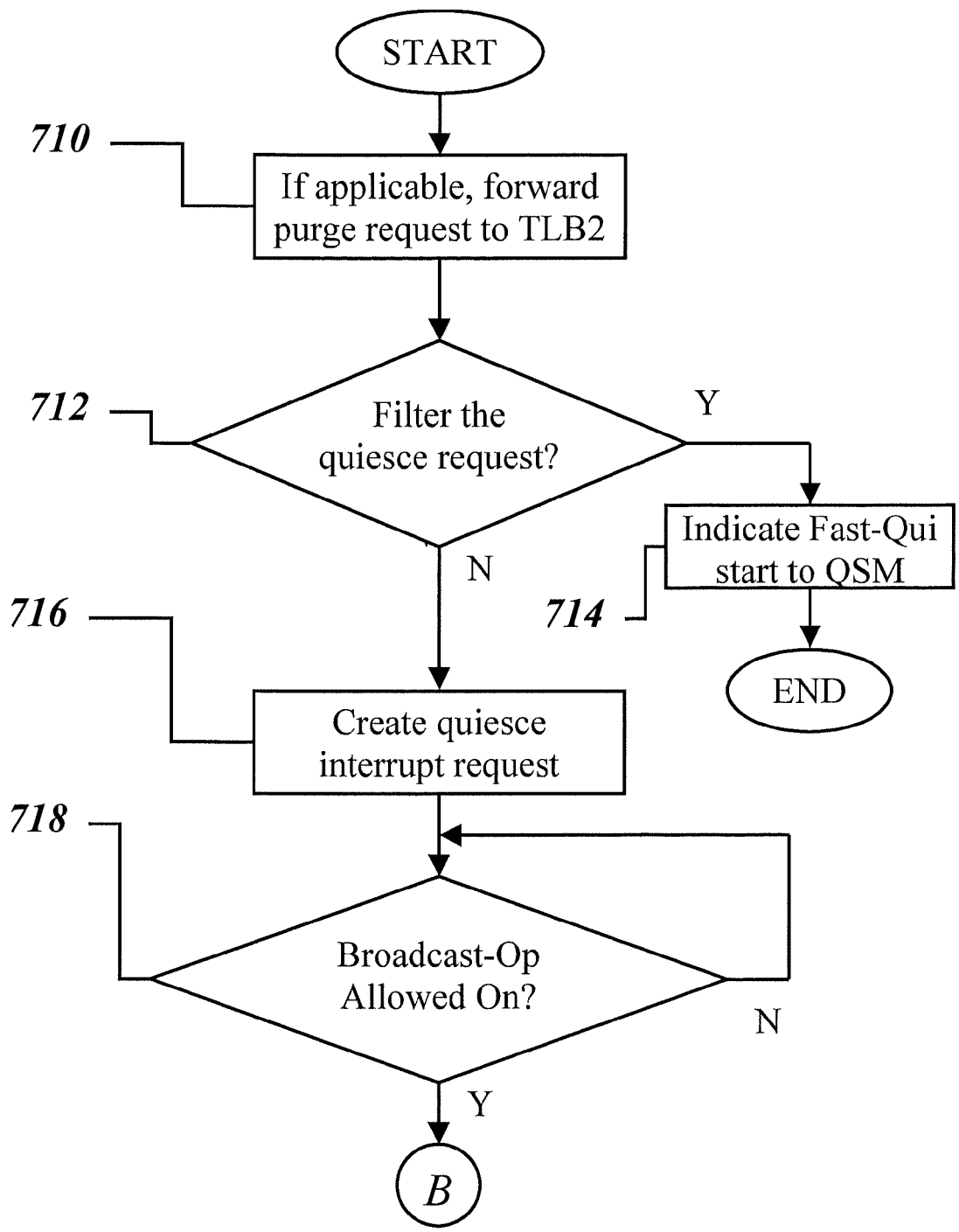
FIGS. 7A-7C depict a flow diagram for receiving and processing a purge associated with the system resource update, in accordance with an aspect of the present invention.
Figure 7B:
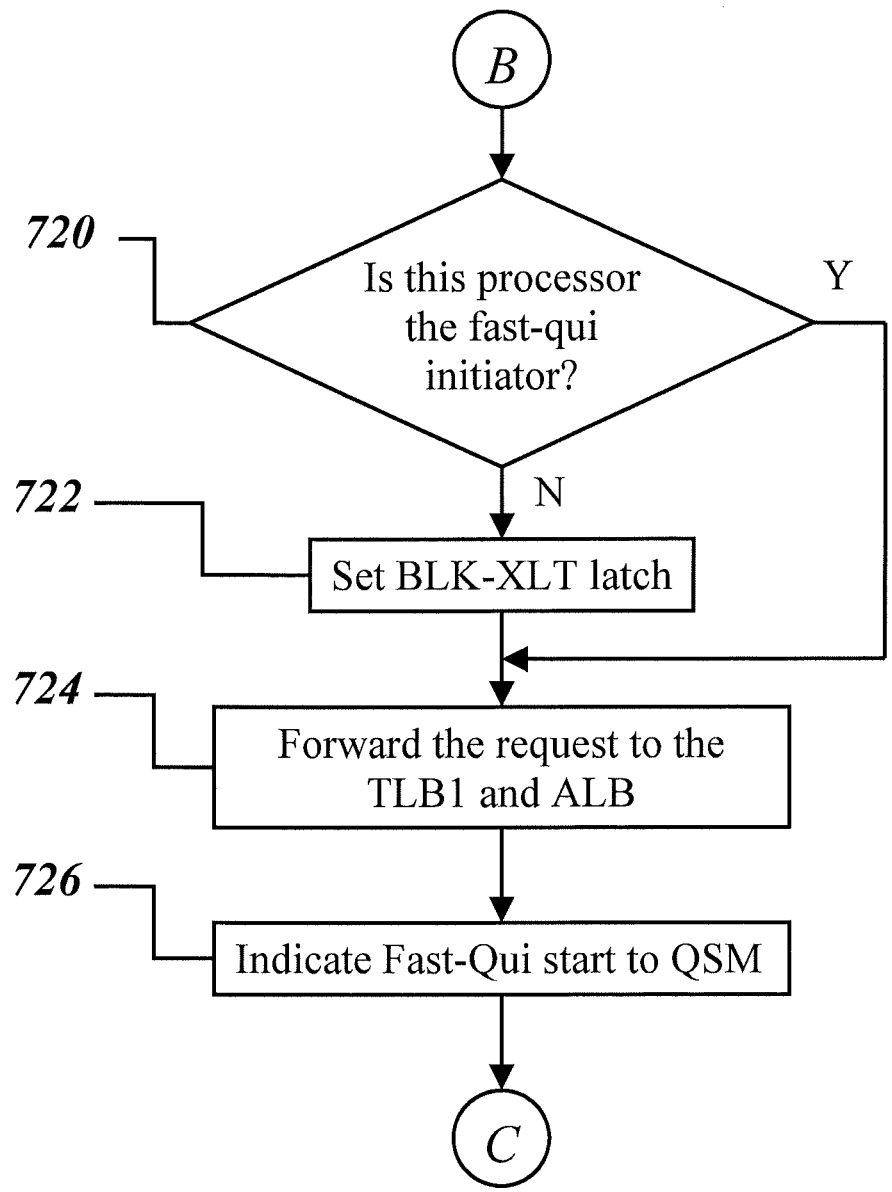

In one embodiment, the translator on the receiver of the quiesce request performs those steps described in FIGS. 7A-7B. In particular, in FIG. 7A it begins by forwarding the quiesce purge request to the TLB2, if applicable (710). The command must be forwarded to the TLB2 if the TLB has buffered any information which may be dependent on the system resource being updated. The translator then determines if the quiesce request is to be filtered by this processor (712). This determination is, in general, based on whether the initiating zone is the same as the zone that is currently running on the processor. If this request can be filtered, then the translator indicates to the quiesce state machine (QSM) in the SC that the request has been started on this processor (714).

If the request is not filtered, i.e. it is honored, on this processor then the translator sends a quiesce interruption request to the asynchronous interruption logic. It is prioritized with other interruptions and forwarded it to the execution controls (716). On a receiving processor, when the processor is at an interruptible point, it will handle the interruption by invoking the quiesce interruption handler in millicode. On the quiesce initiator, the quiesce interruption will be handled by the millicode after it receives indication from the SC that its request was accepted and has been forwarded to all the processors in the system. When handling the fast-quiesce interruption, millicode sets broadcast-op-allowed (718) indicating that the quiesce purge request can be forwarded to the TLB1 and ALB.

As shown in FIG. 7B, if this processor is not the processor that initiated the quiesce request (720) then the translator sets the block-translation latch (722). This latch prevents that processor from performing any translation which may be dependent on the system resources being updated by this quiesce command. It then forwards the purge command to the TLB1 and ALB (724) and indicates to the QSM that this processor has started the quiesce purge request (726).

Figure 7C:
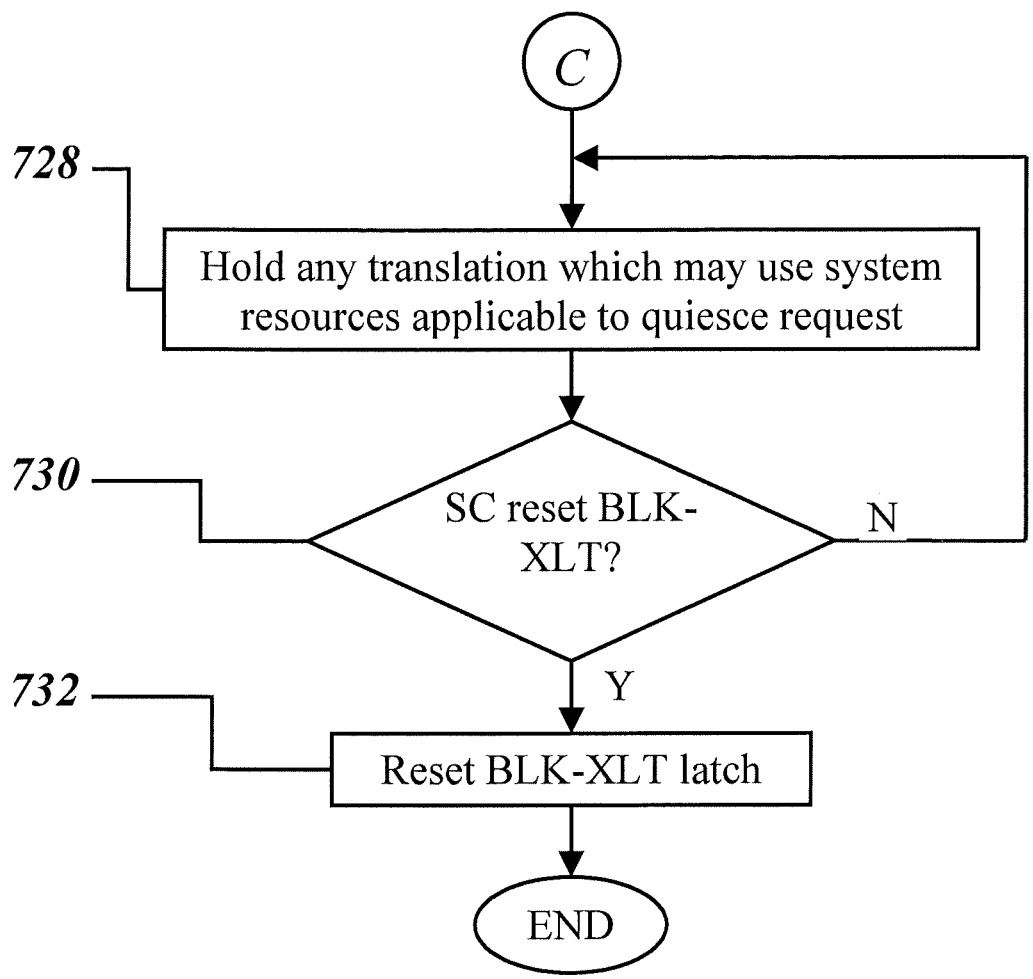

As shown in FIG. 7C, the block-translation latch remains on and the translator continues to block relevant translations (728) until the SC indicates that the block-translation latch can be reset (730). The SC does this once it has received the fast-quiesce reset command from the initiating processor. The translator can then reset its block-translation latch (732) and continue with normal operation.

The processor hardware must handle multiple quiesce requests at the same time. This includes managing the interaction of non-filtered (which requires a quiesce interruption to the processor) with filtered requests. It also requires determining if each command needs to be sent to the TLB1, TLB2, both or neither and coordinating the forwarding between the commands. This is depicted in more detail in FIGS. 8A-8D.

FIGS. 8A-8D illustrate one embodiment of logic local to the processor which handles broadcast purge requests from a single SC. The processor, to a certain extent, handles the requests from each of the SCs in parallel. The maximum number of requests that it must handle at any given time is equal to the number of attached QSMs. The processing of multiple requests can overlap given a few restrictions. The processor can only handle a single non-filtered request at any given time. In addition, although the processor hardware overlaps the start of multiple non-filtered requests and overlaps the start of a non-filtered request with a filtered request in the TLB2, only one request can be processed in the TLB2 at any given time.

Figure 8A:
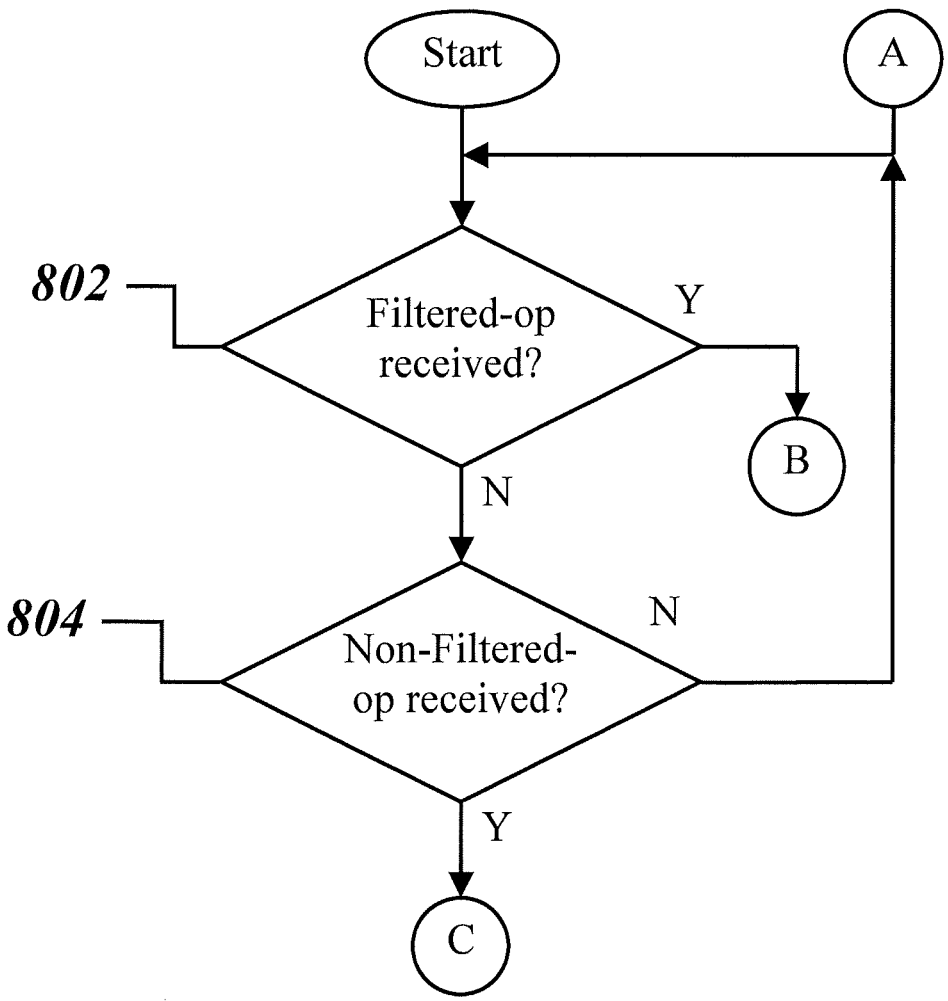
FIGS. 8A-8D depict one embodiment of further details associated with coordination of multiple quiesce purge requests in the processors, in accordance with an aspect of the present invention.
Figure 8B:
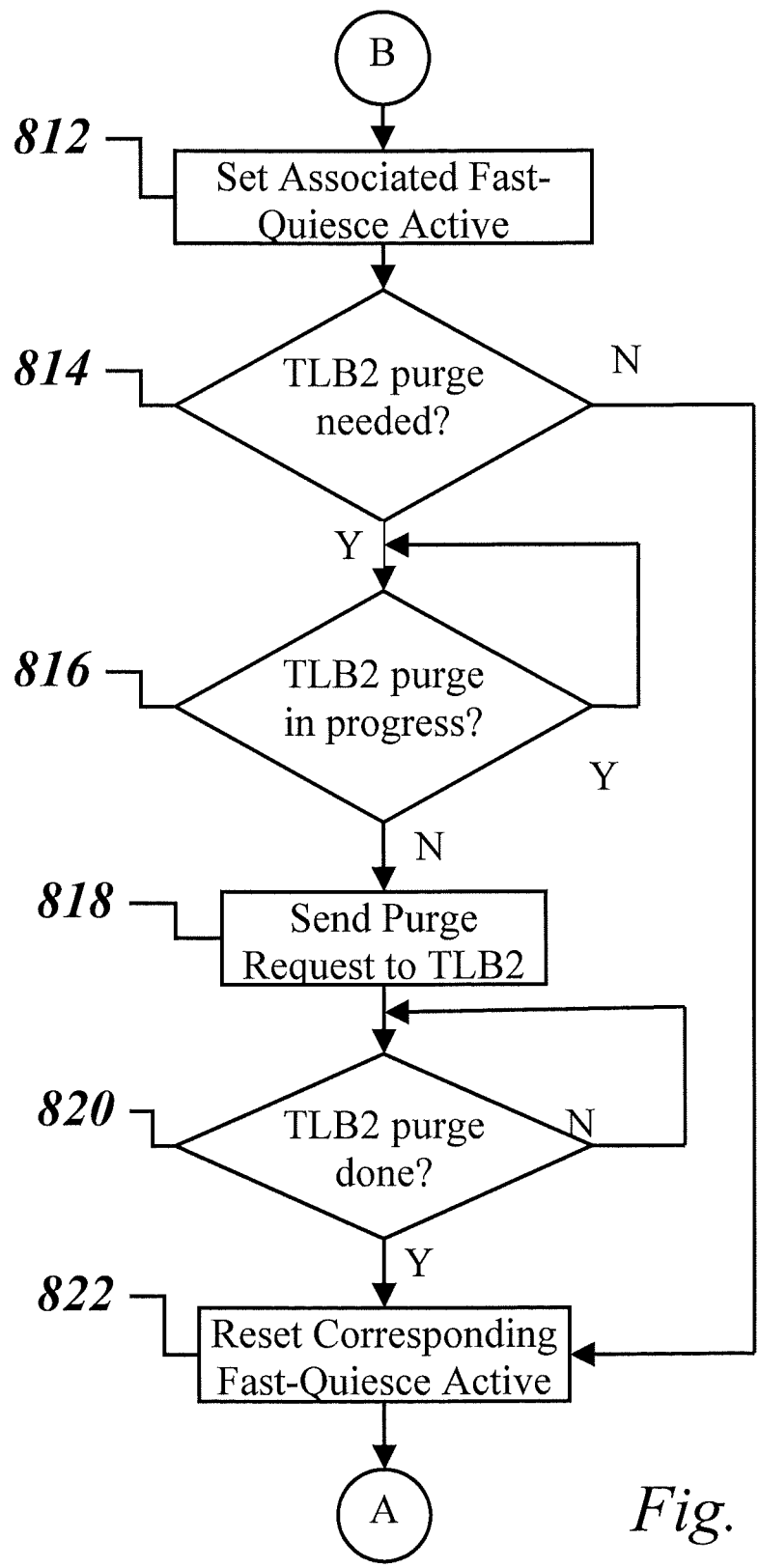

As depicted in FIG. 8A, if the translator (referred to as the translator controls 612 in FIG. 6) receives a filtered broadcast purge request (802), it sets fast-quiesce active to the corresponding QSM (812) to indicate that this processor has started the purge operation as shown in FIG. 8B. The purge request is only sent to the TLB2 if there may be entries in TLB2 which depend on the system resources being updated by the quiesce request. If the request doesn't need to be sent to the TLB2 (814) then, after an appropriate delay, the translator resets fast-quiesce active (822). If the purge request does need to be sent to the TLB2 (814) then the translator waits until the TLB2 is no longer busy with a previous purge (816) and then forwards the request (818) to the TLB2. Once the TLB2 has completed the purge request (820), the translator resets fast-quiesce-active (822) to the SC. The translator can now process another quiesce purge request from that QSM (A).

Figure 8C:
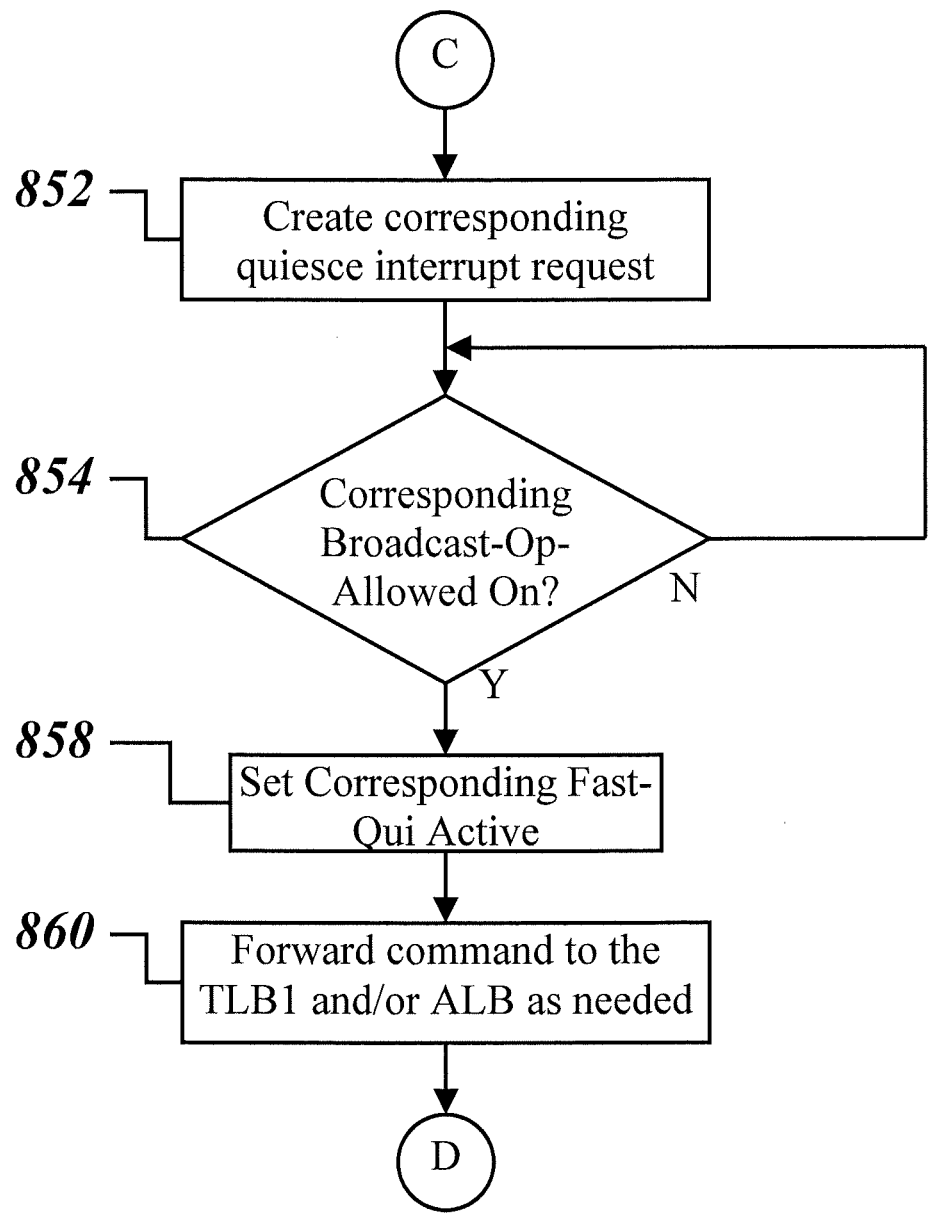
Figure 8D:
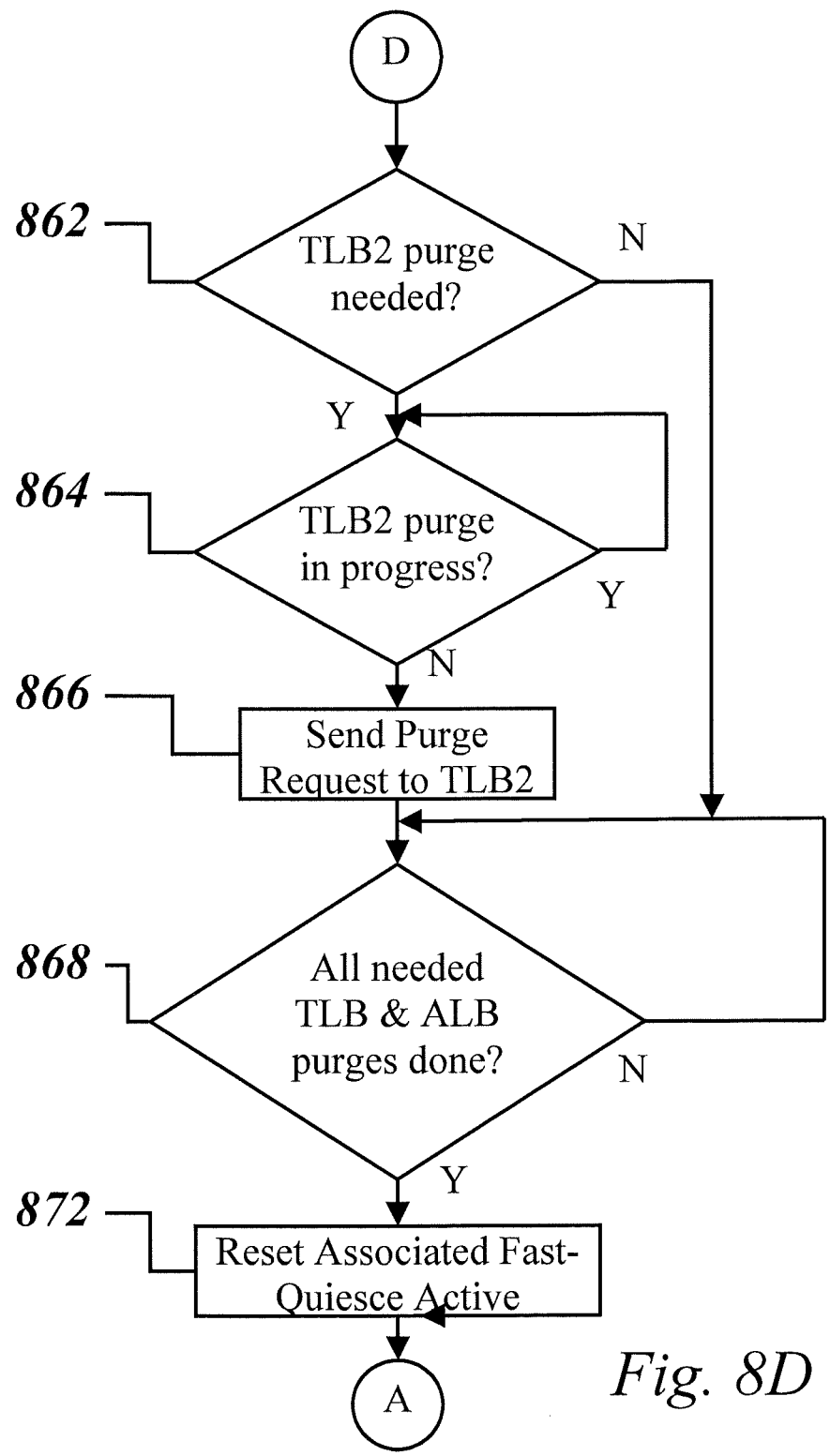

Beginning again in FIG. 8A, if the translator receives a non-filtered quiesce purge (804) then, continuing in FIG. 8C, it sends a quiesce interruption request to the asynchronous logic which makes the request pending in the system (852). The interruption request is handled, as described above, either at the next interruptible point or when appropriate within a quiesce initiator. In previous art, there could only be one quiesce initiator but, with exemplary embodiments of the present invention, there may be multiple. The details of handling other quiesce requests, besides its own, within the quiesce initiator is described below in FIGS. 9A-9B.

The translator waits for the processor to honor the quiesce interruption request (854) and, while doing so, if a filtered request comes in from another QSM it may handle it first as described above. Once the processor has honored the quiesce interruption request and set broadcast-op-forwarding allowed (854), the translator sets fast-quiesce-active (858) to indicate to the QSM that this processor has started the purge operation. It then forwards the request to the appropriate TLB1 and/or ALB (860). Continuing with FIG. 8D, as described for the filtered case, if a TLB2 purge is also needed (862), the translator will wait for the TLB2 to complete any previous purges (864) and then forward the purge request to the TLB2 (866). The translator then waits for all the applicable TLBs and/or ALBs to complete the necessary purge requests (868). If a non-filtered request comes in while waiting for the purge to complete, the translator will handle it assuming that the TLB2 has completed its purge operation. When all the TLBs have completed the purge operation (868), the translator will reset the fast-quiesce active associated with the appropriate QSM and return to the beginning (A). The processor will continue to execute under the restrictions of block-translation until the SC resets that condition.

Figure 9A:
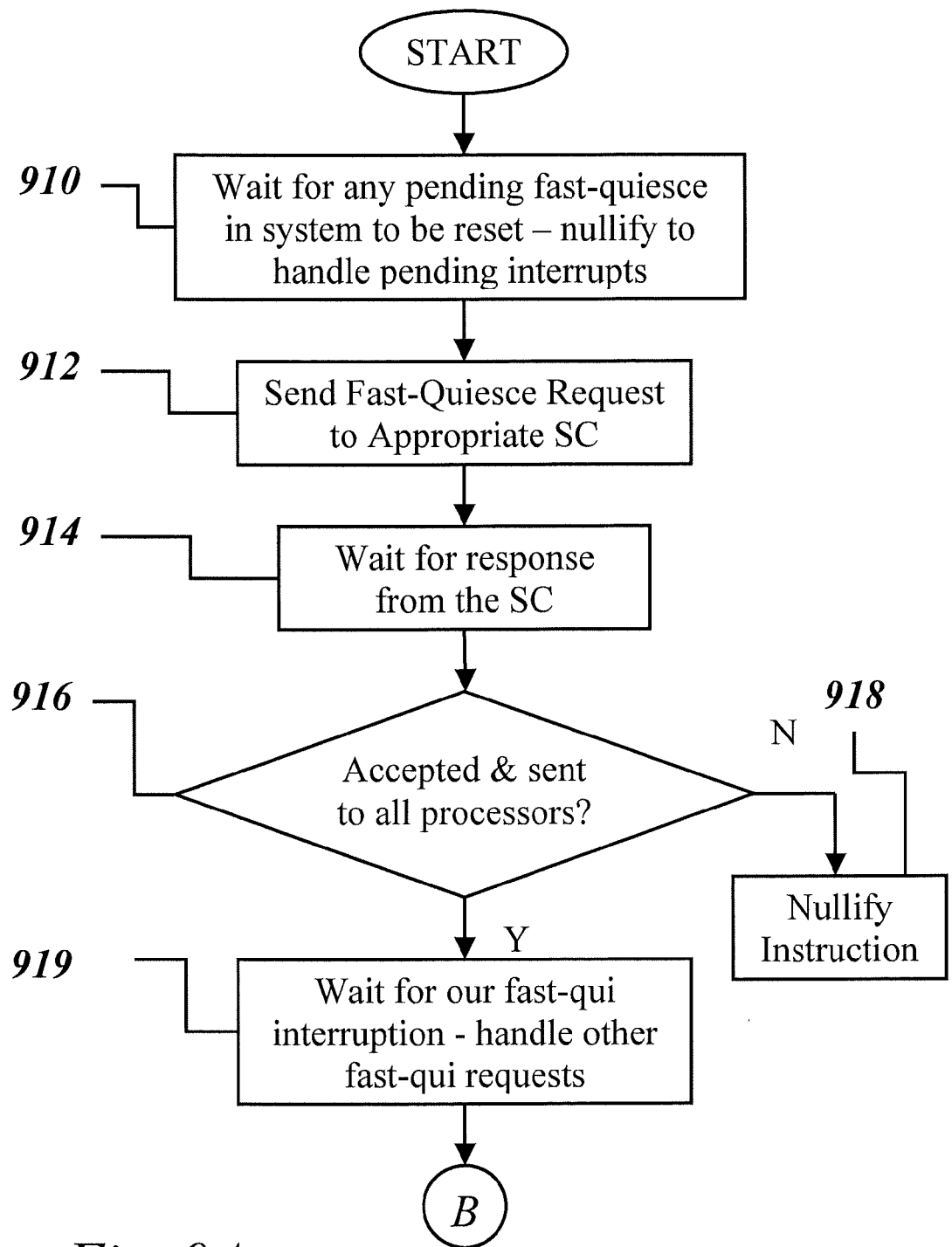
FIGS. 9A-9B depict one embodiment of the flow associated with controlling system resource updates across a computing environment with multiple updates in the system at one time, in accordance with an aspect of the present invention.
Figure 9B:
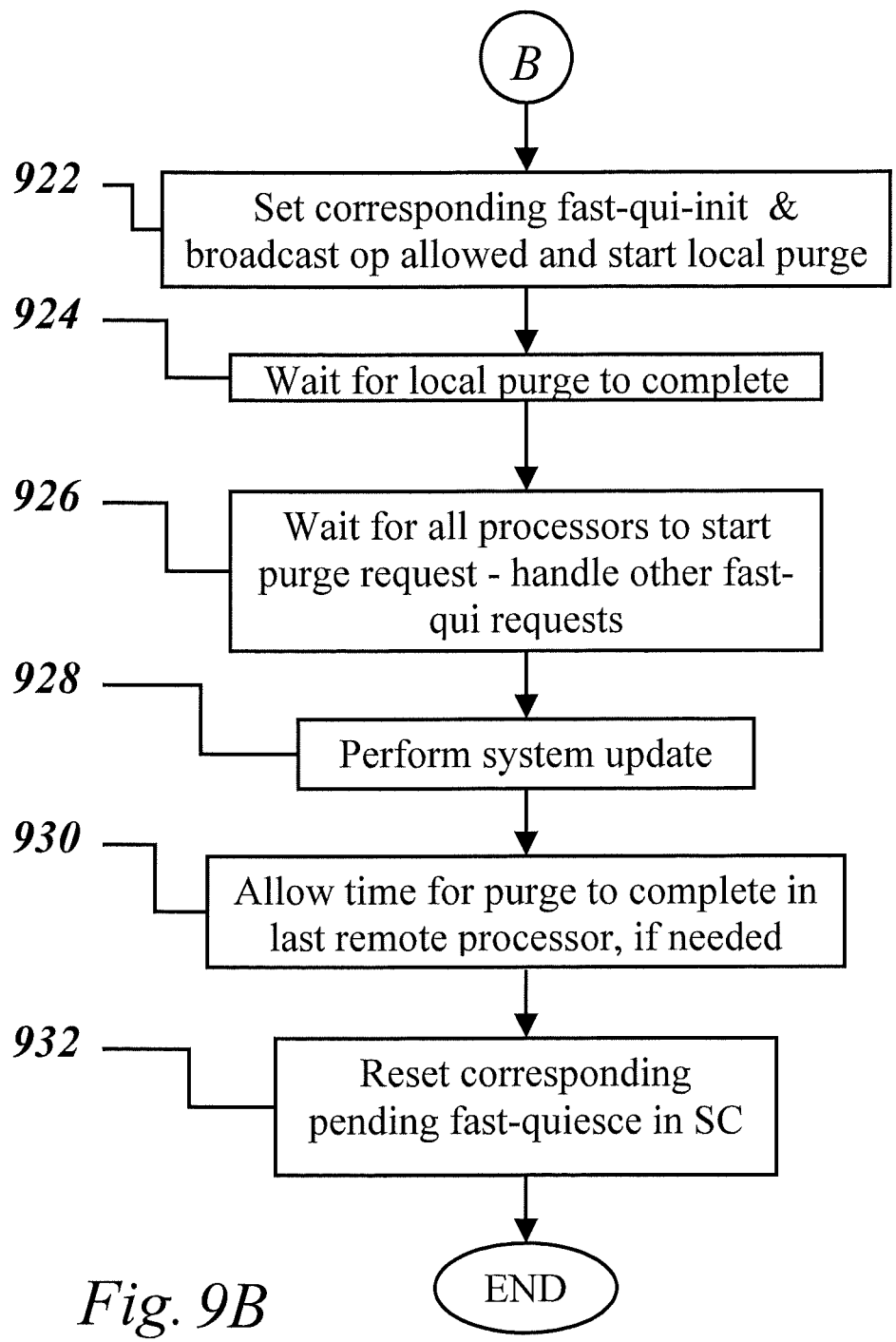

FIGS. 9A-9B depict the quiesce initiators sequence when multi-QSM support is added. It corresponds to FIGS. 5A-5B described previously, with flow 910 corresponding to 510, 912 to 512, and so on. The quiesce initiator must now determine to which QSM it should send the broadcast purge request (912 in FIG. 9A). This determination is done based on zone number. The millicode also needs to differentiate between QSMs with respect to the fast-quiesce-initiator and broadcast-op-forwarding latches (922 in FIG. 9B) as well as when resetting the fast-quiesce interruption condition (932 also in FIG. 9B).

To account for the fact that the quiesce requests may be seen in a different order by the different processors, the initiating processor must honor quiesce requests from other QSMs while in various wait loops within the quiesce initiator routine. This is done to prevent deadlocks between the processors making quiesce requests. This additional handling is required in the initial loop waiting for previous requests to complete (910 in FIG. 9A) and while waiting for our own quiesce request to arrive (919 also in FIG. 9A). The initiator must also handle other requests when waiting for all processors to start the fast-quiesce purge (926 in FIG. 9B).

Technical effects and benefits include the ability to have multiple quiesce requests active in the system at the same time. This may result in reduced system overhead for quiesce operations because the requirement that quiesce requests be performed serially has been removed. In exemplary embodiments of the present invention, several quiesce requests may be acted on by the system at the same time, leading to a reduction in the amount of time spent waiting for quiesce requests to complete.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

As described above, the embodiments of the invention may be embodied in the form of computer-implemented processes and apparatuses for practicing those processes. The capabilities of the present invention can be implemented in software, firmware, hardware or some combination thereof. For example, embodiments of the invention may be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A system for facilitating processing of a computing environment, the system comprising:
    a processor; and
    a first controller comprising system serialization controls configured to quiesce only logical processors of a first set of zones and a second controller comprising system serialization controls configured to quiesce only logical processors of a second set of zones, the system further comprising a memory having program code for execution by the processor to cause the system to perform a method comprising:
    initiating, by a first initiating processor of a first zone, a first quiesce request to the first controller, the first controller configured to handle quiesce requests associated with the first set of zones comprising the first zone;
    initiating, by a second initiating processor of a second zone, a second quiesce request to the second controller, the second controller configured to handle quiesce requests associated with the second set of zones comprising the second zone, wherein each zone in the first set of zones is uniquely associated with only the first controller and each zone in the second set of zones is uniquely associated with only the second controller;
    processing, by the system serialization controls of the first controller, the first quiesce request, the processing comprising providing a first processor quiesce request to processors of the first set of zones, the first processor quiesce request comprising an indication of the first initiating zone, wherein the first initiating zone indication is usable by the processors of the first set of zones for determining a first quiesce action to be performed, and the processing the first quiesce request further comprises the first controller sending a purge request to a receiving processor, the purge request including a tag identifying the first controller, the tag usable by the receiving processor to differentiate between the first and second quiesce requests and to coordinate responding to the first quiesce request separately from the second quiesce request; and
    processing, by the system serialization controls of the second controller, the second quiesce request, the processing comprising providing a second processor quiesce request to processors of the second set of zones, the second processor quiesce request comprising an indication of the second initiating zone, wherein the second initiating zone indication is usable by the processors of the second set of zones for determining a second quiesce action to be performed, wherein the first controller and the second controller are configured to process the first quiesce request and the second quiesce request independently of each other, thereby allowing multiple quiesce requests to be active in the system at the same time.

2. The system of claim 1 wherein all or a portion of the processing of the first quiesce request overlaps in time with the processing of the second quiesce request.

3. The system of claim 1 wherein the system is further configured to perform the method comprising:
    separating the first quiesce request and the second quiesce request based on a zone number of each initiating zone;
    dispatching the first quiesce request from the first initiating processor to a first quiesce state machine of the first controller based on the separating; and
    dispatching the second quiesce request from the second initiating processor to a second quiesce state machine of the second controller based on the separating.

4. The system of claim 3 wherein the first controller processes the quiesce requests from processors in the first set of zones in a serial manner and the second controller processes the quiesce requests from processors in the second set of zones in a serial manner.

5. The system of claim 1 further including one or more additional controllers and corresponding additional sets of zones, each additional controller configured to quiesce only logical processors of zones associated with the respective additional controller.

6. The system of claim 1 wherein the system further comprises a first processor and a second processor, the first and second processors in communication with the first controller for receiving the first quiesce request and with the second controller for receiving the second quiesce request, wherein the first processor responds to the first quiesce request before the first processor responds to the second quiesce request, and the second processor responds to the second quiesce request before the second processor responds to the first quiesce request.

7. The system of claim 1 wherein the processing the first quiesce request further comprises receiving a started indication from the receiving processor in response to the receiving processor acting on the purge request.

8. A method for facilitating processing of a computing environment, the method comprising:
    initiating, by a first initiating processor of a first zone, a first quiesce request to a first controller, the first controller comprising system serialization controls configured to quiesce only logical processors of a first set of zones and to handle quiesce requests associated with the first set of zones comprising the first zone;
    initiating, by a second initiating processor of a second zone, a second quiesce request to a second controller, the second controller comprising system serialization controls configured to quiesce only logical processors of a second set of zones and to handle quiesce requests associated with the second set of zones comprising the second zone, wherein each zone in the first set of zones is uniquely associated with only the first controller and each zone in the second set of zones is uniquely associated with only the second controller;
    processing, by the system serialization controls of the first controller, the first quiesce request, the processing comprising providing a first processor quiesce request to processors of the first set of zones, the first processor quiesce request comprising an indication of the first initiating zone, wherein the first initiating zone indication is usable by the processors of the first set of zones for determining a first quiesce action to be performed, and the processing the first quiesce request further comprises the first controller sending a purge request to a receiving processor, the purge request including a tag identifying the first controller, the tag usable by the receiving processor to differentiate between the first and second quiesce requests and to coordinate responding to the first quiesce request separately from the second quiesce request; and
    processing, by the system serialization controls of the second controller, the second quiesce request, the processing comprising providing a second processor quiesce request to processors of the second set of zones, the second processor quiesce request comprising an indication of the second initiating zone, wherein the second initiating zone indication is usable by the processors of the second set of zones for determining a second quiesce action to be performed, wherein the first controller and the second controller are configured to process the first quiesce request and the second quiesce request independently of each other, thereby allowing multiple quiesce requests to be active in the computing environment at the same time.

9. The method of claim 8 wherein all or a portion of the processing of the first quiesce request overlaps in time with the processing of the second quiesce request.

10. The method of claim 8 further comprising:
    separating the first quiesce request and the second quiesce request based on a zone number of each initiating zone;
    dispatching the first quiesce request from the first initiating processor to a first quiesce state machine of the first controller based on the separating; and
    dispatching the second quiesce request from the second initiating processor to a second quiesce state machine of the second controller based on the separating.

11. The method of clam 10 wherein the first controller processes the quiesce requests from processors in the first set of zones in a serial manner and the second controller processes the quiesce requests from processors in the second set of zones in a serial manner.

12. The method of claim 8 wherein additional quiesce requests are processed by one or more additional controllers having corresponding additional sets of zones, each additional controller configured to quiesce only logical processors of zones associated with the respective additional controller.

13. The method of claim 8 further comprising:
    receiving the first and second quiesce requests at a first processor and a second processor;
    responding to the first and second quiesce requests by the first processor, the first processor responding to the first quiesce request before responding to the second quiesce request; and
    responding to the first and second quiesce requests by the second processor, the second processor responding to the second quiesce request before responding to the first quiesce request.

14. The method of claim 8 wherein the processing the first quiesce request further comprises receiving a started indication from the receiving processor in response to the receiving processor acting on the purge request.

15. A computer program product for facilitating processing of a computing environment, the computer program product comprising:
    a non-transitory computer readable storage medium that is readable by a processing circuit and storing instructions for execution by the processing circuit for performing a method comprising:
        initiating, by a first initiating processor of a first zone, a first quiesce request to a first controller, the first controller configured to quiesce only logical processors of a first set of zones and to handle quiesce requests associated with the first set of zones comprising the first zone;
        initiating, by a second initiating processor of a second zone, a second quiesce request to a second controller, the second controller configured to quiesce only logical processors of a second set of zones and to handle quiesce requests associated with the second set of zones comprising the second zone, wherein each zone in the first set of zones is uniquely associated with only the first controller and each zone in the second set of zones is uniquely associated with only the second controller;
        processing, by the first controller, the first quiesce request, the processing comprising providing a first processor quiesce request to processors of the first set of zones, the first processor quiesce request comprising an indication of the first initiating zone, wherein the first initiating zone indication is usable by the processors of the first set of zones for determining a first quiesce action to be performed, and the processing the first quiesce request further comprises the first controller sending a purge request to a receiving processor, the purge request including a tag identifying the first controller, the tag usable by the receiving processor to differentiate between the first and second quiesce requests and to coordinate responding to the first quiesce request separately from the second quiesce request; and processing, by the second controller, the second quiesce request, the processing comprising providing a second processor quiesce request to processors of the second set of zones, the second processor quiesce request comprising an indication of the second initiating zone, wherein the second initiating zone indication is usable by the processors of the second set of zones for determining a second quiesce action to be performed, wherein the first controller and the second controller are configured to process the first quiesce request and the second quiesce independently of each other, thereby allowing multiple quiesce requests to be active in the computing environment at the same time.

16. The computer program product of claim 15 wherein all or a portion of the processing of the first quiesce request overlaps in time with the processing of the second quiesce request.

17. The computer program product of claim 15 further comprising:

separating the first quiesce request and the second quiesce request based on a zone number of each initiating zone;

dispatching the first quiesce request from the first initiating processor to a first quiesce state machine of the first controller based on the separating; and dispatching the second quiesce request from the second initiating processor to a second quiesce state machine of the second controller based on the separating.

* * * * *